United States Patent [19]

Terentiev et al.

[11] Patent Number: 4,597,928

[45] Date of Patent: Jul. 1, 1986

[54] METHOD FOR FIBERBOARD MANUFACTURE

[75] Inventors: Otto A. Terentiev, Leningrad; Anatoly V. Burov, Leningradskaya; Ekaterina Y. Vorobieva; Ekaterina I. Grudinka, both of Trakaisky; Gennady T. Nesterchuk; Oleg I. Shapovalov, both of Leningrad; Khamdam U. Usmanov, Tashkent; Shavkat M. Mirkamilov, Tashkent; Tolkun M. Mirkamilov, Tashkent; Vladimir V. Sharkov, Leningrad, all of U.S.S.R.

[73] Assignees: Leningradsky Tekhnologichesky Institute Tselljulozno-Bumazhnoi Promyshlennosti; Proizvodstvennoe Obiedinenie "Litbumprom", both of Leningrad, U.S.S.R.

[21] Appl. No.: 593,031

[22] Filed: Mar. 23, 1984

[51] Int. Cl.$^4$ .................................. B29C 41/28
[52] U.S. Cl. .................................. 264/87; 44/1 E; 44/10 B; 44/15 D; 264/518; 264/109; 264/115; 264/120; 264/122; 264/123; 264/126; 264/236; 264/324; 524/13; 524/14; 527/103; 527/105
[58] Field of Search ............... 264/115, 122, 123, 324, 264/87, 518, 109; 44/1 E, 10 B, 15 D; 524/14, 13; 527/103, 105

[56] References Cited

U.S. PATENT DOCUMENTS

| | | | |
|---|---|---|---|
| 768,599 | 8/1904 | Goldman | 264/115 |
| 2,442,897 | 6/1948 | Loughborough | 527/105 |
| 3,174,940 | 3/1965 | Lacoste | 524/14 |
| 3,231,526 | 1/1966 | Wilson | 524/13 |
| 3,293,200 | 12/1966 | MacGregor | 524/13 |
| 3,306,864 | 2/1967 | Lang et al. | 524/13 |
| 3,990,180 | 11/1976 | Bunting | 524/13 |
| 4,003,866 | 1/1977 | Paturle | 524/13 |
| 4,073,753 | 2/1978 | Hauge | 524/13 |
| 4,229,183 | 10/1980 | Eneroth | 44/1 D |
| 4,303,561 | 12/1981 | Piesch et al. | 524/35 |

FOREIGN PATENT DOCUMENTS

| | | | |
|---|---|---|---|
| 0044640 | 7/1961 | Poland | 524/14 |
| 0811533 | 4/1959 | United Kingdom | 524/14 |

*Primary Examiner*—Jeffery Thurlow
*Attorney, Agent, or Firm*—Ladas & Parry

[57] ABSTRACT

Disclosed in accordance with the invention is a method for fiberboard manufacture comprising the steps of steaming and grinding woodchips to obtain a wood pulp, using said wood pulp to prepare a slurry of wood pulp in water, mixing said slurry with a binder, a cure catalyst for the binder, a water-repellent additive, peat, and carbamide to obtain a mixture, casting said mixture and dewatering said mixture to obtain a mat, and compacting said mat to obtain fiberboard which is subjected to heat treatment, in which method the peat used has a moisture content of between 25 and 70 percent and the peat content in said mixture is between 2.5 and 50 percent by mass, with the ratio of absolutely dry peat to said binder equal to between 1.0–7:1.0, respectively, while the carbamide content in said mixture is between 0.2 and 2.0 percent by mass, with the ratio of said carbamide to said binder equal to between 0.02–1:1, respectively.

1 Claim, No Drawings

METHOD FOR FIBERBOARD MANUFACTURE

FIELD OF THE INVENTION

The present invention relates to the wood pulp and paper industry, and, more particularly, to a method for fiberboard manufacture.

This invention can be used to best advantage for the manufacture of fiberboards designed for wall, ceiling, and door cladding in the interior of rooms and railway cars, as well as for lightweight house building and furniture manufacture.

BACKGROUND OF THE INVENTION

The fabrication of fiberboard by the wet process (Thomas M. Maloney. Modern Particleboard and Dry-process Fiberboard Manufacturing. Pullman, Wash., 1977) is known to make use of vegatable raw materials, viz. ground and suitably treated softwood, or hardwood, or mixtures thereof.

However this known method of fiberboard manufacture has an essential drawback in that it requires consumption in large quantities of wood presently available at high cost.

There is another known method for fiberboard manufacture, in which the consumption of high-cost wood is reduced by replacing it in part with additives, such as sawdust or bark (S. P. Rebrin. Tekhnologiya drevesnovoloknistykh plit (Fiberboard Technology). Lesnaya Promyshlennost Publishers, Moscow, 1982, pp. 5, 18, 19).

The use of wood processing or sawmilling wastes for the purpose of fiberboard manufacture by the wet process does make for a reduction in the consumption of expensive wood.

Yet the method in question is fraught with several difficulties. Thus, for example, the use of sawdust as an additive in fiberboard fabrication necessitates the use of specially designed grinding equipment, this raising the costs of and complicating the wet-process technology of fiberboard fabrication. Where bark is utilized as an additive, the quality of the fiberboard suffers, the detrimental effect being due to the bark moisture content normally not exceeding 20 percent. The relatively low moisture content of bark has a negative effect upon the quality of the fiber, with the fiberboard surface becoming non-uniform as a consequence. It is for this reason that the use of bark as a partial substitute for wood in fiberboard manufacture has but a limited scope of application.

Other partial substitutes for wood that can be used in fiberboard fabrication are sugar cane stems (USSR Pat. No. 211,452 dated 25.03.1966), hydrolysis lignin (USSR Inventor's Certificate No. 331,930 dated 25.12.1969), and activated sludge (USSR Inventor's Certificate No. 537,843 dated 23.05.1975).

The process that has the most widespread usage in fiberboard manufacture is the wet process using woodships as the principal raw material (S. P. Rebrin. Tekhnologiya drevesnovoloknistykh plit (Fiberboard Technology). Lesnaya Promyshlennost Publishers, Moscow, pp. 114-120).

This raw material is subjected to steam treatment in steaming units to be subsequently ground in mills. The wood pulp obtained as a result of woodship milling is additionally diluted with water to a concentration not exceeding 4 percent. Then the pulp is further ground and further diluted with water. The concentration of wood pulp in the water slurry thus obtained does not exceed 0.9 to 1.8 percent. In the sizing box, water-repellent agents are added to the water slurry, such as paraffin, oleic acid, sulphate soap, or a ceresin compound. The concentration of the water-repellent additive does not exceed 1 percent. The additive is introduced in the form of a finely dispersed emulsion. The emulsion envelopes wood fibers and fills the pores in the final product, preventing the ingress of moisture into the finished fiberboard. To assure a greater mechanical strength in fiberboard in the process of fabrication, binding agents are also added into the sizing box, such as, for example, phenol-formaldehyde resin, along with a suitable hardener, such as sulphuric acid. After mixing the aforesaid components in the sizing box, the resultant water slurry is cast over a wire screen, a fibermat forming upon the wire screen as a consequence. The mat is obtained in the following sequence of operations: pouring water slurry over the screen—filtering off water by gravity through the wire screen—removing water by suction with the aid of a vacuum unit and further by mechanical squeezing. As a result, a mat is obtained with a relative moisture content of about 80 percent. This is then forwarded to pressing rolls for edge trimming and further dewatering, with the relative moisture content being reduced here to 60 percent. This done, the fibermat is compacted at a temperature of 200° to 215° C. and a pressure of 5 to 5.5 MPa. In the compaction process, water is further removed so that the resulting fiberboard has a moisture content of 0.5 to 1.5 percent. To assure a high level of binder curing and thereby high strength characteristics, the compacted fiberboard is maintained in heat treatment ovens at a temperature of 160° to 170° C. for a period of four hours. Then the fiberboard is transferred to special chambers to be treated there with air having a relative humidity of 98 percent at a temperature of 65° C. The fiberboard thus acquires an uniform moisture content throughout and shows no tendency to surface warping while in storage.

For all that the method as described above also has a number of essential drawbacks. Apart from the large amount of high-cost wood to be used in the wet-process fabrication of fiberboard, there are also waste waters to cause environmental pollution, since these contain such highly toxic substances as phenol and formaldehyde which find their way into waste waters from the phenol-formaldehyde resin binder. Another disadvantage is the length of time consumed in maintaining fiberboard in heat treatment chambers where they acquire mechanical strength due to the curing of the binder at high temperature. The large period of time required for binder curing is due to the low concentration in the product of sulphuric acid used as cure catalyst, while the low catalyst concentration is due to losses caused by dissolving in and entrainment with waste waters. Incomplete curing of the resin imparts toxicity to the finished product. This toxicity is due to the presence of uncured phenol and formaldehyde which will evaporate from the product into the surrounding air. Emission of said components and their presence in the surrounding air will cause various diseases of allergic nature in human beings.

SUMMARY OF THE INVENTION

The present invention has for its object a reduction in the consumption of expensive vegetable raw materials in the process of fiberboard manufacture.

Another object of the present invention is a reduction in the concentration of toxic substances in the waste waters which originate from fiberboard fabrication by the wet process.

It is also an object of the present invention to reduce the emission of highly toxic phenol and formaldehyde from the finished product into the surrounding air.

A further object of the invention is to obtain fiberboards having high physical properties.

A still further object of the present invention is to improve the surface quality of the finished products without any additional treatment.

It is likewise an object of the present invention to increase the production efficiency and cut down the energy costs involved.

With these and other objects in view, there is provided a method for fiberboard manufacture comprising the steps of steaming and grinding woodchips to obtain a wood pulp, using said wood pulp to prepare a slurry of wood pulp in water, mixing said slurry with a binder, a cure catalyst for the binder, and a water-repellent additive, casting the mixture subsequently and dewatering it to obtain a mat, said mat being further compacted to give fiberboard which is subjected to heat treatment, wherein, according to the invention, 2.5 to 50 percent by mass of peat having a moisture content of 25 to 70 percent, with the ratio of absolutely dry peat to binder equal to between 1.0–7:1.0, respectively, is added to the mixture before casting, in the presence of 0.2 to 2.0 percent by mass of carbamide, with the carbamide-to-binder ratio equal to between 0.02–1.0:1.0 respectively. Peat is an organic fossil containing over 50 percent of mineral substances ("Prevrashcheniye torfa i yego komponentov v protsesse samorazogrevaniya pri khranenii" ("Conversions of peat and components thereof in the process of self-heating while in storage)". Edited by N. S. Pankratova. Nauka i tekhnika. Minsk, 1972, pp. 22, 23,81, 300).

Table 1 gives the composition of a peat that can be suitably used as an additive in fiberboard fabrication.

The vegetable fibers present in peat make good substitutes for expensive wood. They possess paper-forming properties which make it possible to obtain fiberboard featuring high strength characteristics.

The presence in peat of a large quantity of mineral substances which are capable of reacting chemically with phenol and formaldehyde, permits of binding free phenol and formaldehyde in inert compounds. Peat is also capable of sorbing chemical substances from waste waters, which allows of drastically reducing environmental pollution by harmful substances originating in fiberboard manufacture by the wet process.

The presence in the peat composition of humic and fulvic acids enables a higher binder curing level in the finished product and a shorter time period for binder curing. The explanation lies in the fact that weak organic acids, such as humic or fulvic acids, acquire high acidity at high temperatures and may thus serve the function of a substitute for sulphuric acid accepted here as hardener. A high binder curing level automatically results in higher mechanical properties in fiberboard and a lower concentration of free phenol and formaldehyde in the cured binder, with a consequently lower emission of said substances from the finished product into the surrounding air.

TABLE 1

| Characteristics | Concentration of peat components, % based on organic matter in peat | |
|---|---|---|
| | top peat | basin peat |
| Decomposition level % | 5–15 | 20–25 |
| Water solubles at 50° C. | 0.7–1.5 | 1.1–1.3 |
| Water solubles at 100° C. | 1.5–3.6 | 2.3–3.1 |
| Easily hydrolyzable matter, including hemicellulose | 25.4–46.7 | 24.8–33.4 |
| | 10.3–24.6 | 13.8–21.3 |
| Humic acids | 8.5–16.5 | 28.3–36.4 |
| Fulvic acids | 9.2–17.3 | 11.9–12.4 |
| Lignin (non-hydrolyzable) | 4.8–9.2 | 10.6–15.7 |
| Bitumens | 4.8–10.1 | 10.6–15.7 |

With the starting pulp for fiberboard preparation incorporating peat which is known to contain coloured compounds of natural origin, mineral salts, and bitumens, the fiberboards are obtained with a good surface requiring no further treatment with varnishes, lacquers, or paints. The presence in peat of easily hydrolyzable substances, as well as hemicelluloses, favours higher surface quality and higher mechanical properties in the finished product owing to the sizing effect produced by said compounds upon the product obtained. High strength, water resistance, a smooth and glossy surface featuring high aesthetical characteristics are among the properties of the fiberboards obtained.

Where peat is treated additionally with such a reagent as carbamide ($NH_2$—CO—$NH_2$), the strength properties of fiberboard are further enhanced due to the chemical ability of carbamide to react with formaldehyde, as well as phenol. In this reaction, high-molecular-weight carbamide resins are formed to assure enhanced product strength and lower formaldehyde-to-air emission in consequence of the fact that formaldehyde is converted in this case to chemically bound state to a greater extent and thus is incapable of evaporating into the air.

In accordance with the invention, peat can be used conveniently for fiberboard fabrication without any preliminary drying in heat treatment chambers, which is advantageous economically. Under natural storage conditions, peat as excavated can have a moisture content ranging from 25–30 percent to 60–70 percent. Within this range, however, it retains its paper-forming properties while there occur undesirable conversion processes when peat is heated in the heat treatment chamber for drying. Table 2 contains some information concerning peat conversions at several temperatures.

TABLE 2

| Loss of organic matter from peat on heating, % by mass | Heating temperature, °C. |
|---|---|
| 0.7 | 54 |
| 7.6 | 79 |
| 10.1 | 81 |

Within the temperature range of 140° to 150° C., peat undergoes degradation. Within the temperature range of 50° to 120° C. the losses in the chemical composition of peat are mainly at the cost of the carbohydrate complex.

We have discovered experimentally that peat having a moisture content of 25 to 70 percent, without undergoing any heat treatment, can be used for fiberboard fabrication by the wet process starting with a concentration of 2 to 3 percent. Where peat is used in quantities exceeding 50 percent by mass, it becomes necessary to increase the amount of phenol-formaldehyde resin in the product or else that of a water-repellent additive, to avoid an undesirable increase in the water absorption of the finished fiberboard.

However, using peat for fiberboard fabrication in high concentrations, close to 50 percent by mass, affords a drastic reduction in the quantity of chemical contaminants present in the waste waters, apart from replacing a considerable part of the raw materials of vegetable origin. Reduction in contaminants is based upon the well known ability of peat to well adsorb chemical substances, odours, and colorants. In the case under consideration the presence of carbamide in the starting pulp used for fiberboard fabrication is minimal.

Where peat is used in an amount of 2 to 20 percent by mass, carbamide addition should preferably by 0.2 to 2.5 percent by mass.

The use of carbamide is particularly advantageous where low peat concentrations are used for fiberboard fabrication.

The advantage inherent in the use of carbamide lies in the fact that carbamide enhances the binding function of peat with respect to formaldehyde. As far as peat itself is concerned, the inventors were the first in the world practice to discover its paper-forming properties. It is these properties that made it possible for the inventors to use peat as a partial substitute for wood in the wet-process fiberboard fabrication. Previously, when the paper-forming properties of peat were unknown, it was used only as a dry inert filler in the dry-process fiberboard manufacture.

DETAILED DESCRIPTION OF THE INVENTION

Softwood alone or in mixture with hardwood is ground after a preliminary heat treatment (steaming). Partial hydrolysis takes place in the process, with internal fiber surface development and fibers becoming more hydrophilic and plastic.

The water-saturated wood pulp obtained in the grinding process is further diluted to obtain a pulp-in-water slurry with a concentration of at least 4 percent by mass.

After a second grinding operation (refining), the wood pulp slurry is sent to a sizing box. Sizing favours lower water absorption and swelling, as well as higher mechanical strength in the finished fiberboard. Into the sizing box are added water-repellent agents, such as, for example, a paraffin emulsion in an amount not exceeding 1 percent (based on the absolutely dry fiber mass). To increase the mechanical strength of fiberboard, phenol-formaldehyde is used as binder, in a concentration of 10 percent and in an amount not exceeding 2 percent (based on the absolutely dry wood fiber mass), with sulphuric acid used as cure catalyst in an amount of 0.4 percent (based on the absolutely dry wood fiber mass) and in a concentration not exceeding 3 percent by mass.

In the sizing box, the wood pulp slurry is mixed with a peat-in-water slurry. To this end, peat having a moisture content of between 30 and 70 percent is diluted with water and passed through a screen filter whence it is fed to the sizing box in an amount of 2 to 50 percent by mass (based on the absolutely dry wood fiber mass).

After 0.2 to 2.0 percent by mass of carbamide is added into the sizing box, the mixture is stirred and fed by gravity into the head box of a forming machine. While in the pulp line and prior to delivery to the head box of the forming machine, the starting mixture is diluted with circulating or fresh water to a concentration of 1.8 percent maximum. The pH value in the head box is to be maintained not higher than 5.0.

The wood pulp slurry complete with the additives is cast over a wire screen whereon a 150 mm thick fibrous mat is obtained after excess water is removed by drainage through the screen, suction with the aid of a vacuum unit, and mechanical squeezing. The rate of wood pulp slurry pouring on to the wire screen is to be 5 to 10 percent lower than the screen speed. The moisture content of the mat downstream of the forming machine is not to exceed 73 percent.

Downstream of the forepresses, the resulting fiberboard is cut to size and sent for pressing at a temperature of 190° to 230° C. and a pressure of 5.0 to 5.5 MPa. Following the pressing stage the fiberboards are subjected to heat treatment for a period of 3.5 to 4 hours at a temperature not exceeding 168° C. After cooling the fiberboards to 40°-60° C., they are moistened to a moisture content of 6 to 10 percent and sent to the finished product storage.

The following parameters are used to control the quality of the finished products:

1. Ultimate flexural strength (MPa) as determined on a testing machine providing for a measuring error not exceeding 1 percent and a loading rate equal to 30 mm/min.
2. Water absorption in percent, for 24 hours, as determined by weighing.
3. Swelling in percent, for 24 hours, as determined by specimen thickness measurements.
4. Formaldehyde emission from the finished product, in $mg/m^3$, as determined conventionally from the reaction between formaldehyde and phenylhydrazine hydrochloride in the presence of an oxidant in an alkaline medium.
5. Phenol emission from the finished product, in $mg/m^3$, as determined conventionally from the reaction between phenol and diazotized n-nitraniline.
6. Formaldehyde concentration in waste waters, in mg/l, as determined conventionally by colorimetry using phenylhydrazine.
7. Phenol concentration in waste waters, in mg/l, as determined conventionally by colorimetry using diazotized n-nitraniline.

The following typical examples will serve to illustrate some aspects of the present invention and make more fully apparent specific features and advantages thereof.

EXAMPLE 1

Wood pulp prepared by grinding steamed woodchips to a freeness value of at least 14 defibrator-second was pumped into refiners. After grinding in the refiners, the pulp was fed by gravity into a continuous sizing box where it was diluted to a concentration of 2.8 mass %. Also added into the sizing box were a paraffin emulsion concentrated to 80 g/l and taken in the amount of 1% (based on the absolutely dry wood fiber mass), phenol-formaldehyde resin in the amount of 2% (based on the absolutely dry wood fiber mass), and sulphuric acid having a specific gravity of 1.012 and taken in the amount of 0.4% (based on the absolutely dry wood fiber mass). On mixing said components, carbamide was added to the mixture, in the amount of 2.0% (based on the absolutely dry wood fiber mass). Following that, a 20% peat-in-water slurry was fed into the sizing box. The peat used had an initial moisture content of 25% and was taken in the amount of 2.0% (based on the absolutely dry wood fiber mass). The peat slurry was forced through a screen filter as a preliminary step. In the pulp line upstream of the head box, the wood pulp slurry was diluted to a concentration of 1.8 mass %, with the pH value equal to 5.0. Upon casting the wood pulp slurry over the wire screen, the fibrous mat obtained as a result was passed between the rolls of three fore presses, with the daylights equal to 14–15 mm, 13–14 mm, and 12–13 mm, respectively.

Fiberboard pressing was carried out at a pressure of 5.5 MPa, with the daylights equal to 10–13 mm in the first press, 10–11 mm in the second, and 8–9 mm in the third. The pressing temperature was 190° C. After heat treating the fiberboards for a period of 2 hours at a temperature of 168° C. and moistening them with water having a temperature of 50° C. to obtain a moisture content of 10%, the fiberboards exhibited physical properties as shown in Table 3.

EXAMPLE 2

Using the conditions of Example 1, fiberboards were prepared, with the additives including 6% of peat (based on the absolutely dry wood fiber mass), phenol-formaldehyde resin taken in the amount of 2% (based on the absolutely dry wood fiber mass), and 2% of carbamide (based on the absolutely dry wood fiber mass). The initial moisture content of peat was 35%. Fiberboard heat treatment time was 2 hours. The physical properties of the fiberboards were as shown in Table 3.

EXAMPLE 3

Using the conditions as described in Example 1, fiberboards were prepared, with the additives used including peat taken in the amount of 15% (based on the absolutely dry wood fiber mass). The peat had an initial moisture content of 40%. The quantity of phenol-formaldehyde resin used as binder was 2% (based on the absolutely dry wood fiber mass). Carbamide was taken in the amount of 18% (based on the absolutely dry wood fiber mass). Fiberboard heat treatment time was 2 hours. The physical properties were as shown in Table 3.

EXAMPLE 4

Using the conditions as described in Example 1, fiberboards were prepared incorporating peat as an additive in the amount of 30% (based on the absolutely dry wood fiber mass). The initial moisture content of the peat was 60%. The quantity of carbamide used was 1% (based on the absolutely dry wood fiber mass). The binder quantity was 3% (based on the absolutely dry wood fiber mass). Fiberboard heat treatment time was 2.5 hours. The physical properties of the fiberboards thus obtained were as shown in Table 3.

EXAMPLE 5

Using the conditions as described in Example 1, fiberboards were fabricated incorporating peat as an additive taken in the amount of 45%. The initial moisture content of the peat used was 50%. The amount of phenol-formaldehyde resin incorporated in the slurry was 8% (based on the absolutely dry wood fiber mass). The carbamide quantity was 0.2% (based on the absolutely dry wood fiber mass). Fiberboard heat treatment time was 1.2 hours. The physical properties of the fiberboards obtained were as shown in Table 3.

EXAMPLE 6

Using the conditions as described in Example 1, fiberboards were prepared incorporating as an additive peat having a moisture content of 70%. The amount of peat used was 50% (based on the absolutely dry wood fiber mass). The binder quantity was 10% (based on the absolutely dry wood fiber mass). Fiberboard heat treatment time was 1.5 hours. Carbamide was not used in this example of fiberboard fabrication. The physical properties of the fiberboards obtained were as shown in Table 3.

EXAMPLE 7 (FOR COMPARISON)

Using the conditions as described in Example 1, fiberboards were fabricated incorporating 2% of phenol-formaldehyde resin (based on the absolutely dry wood fiber mass). No use was made of peat or carbamide. Fiberboard heat treatment time was 4.0 hours. The physical properties were as shown in Table 3.

As may be seen from the foregoing information and the data cited in Table 3, the use of the proposed method yields fiberboards featuring high physical properties, such as water absorption, strength, and swelling in water.

Replacement in part of expensive wood with peat not only makes it possible to cut down the capital costs involved in fiberboard fabrication, but also to reduce to a considerable extent environmental pollution owing to a reduced concentration of phenol and formaldehyde in the waste waters and in the air. The use of carbamide-modified peat enables higher production efficiency and lower energy costs on account of less time consumed at the heat treatment stage.

TABLE 3

| | Quantity of components taken for experimentation, % by mass | | | moisture content of peat, % | Ratios | | Fiberboard mm | Fiberboard ultimate strength, MPa |
|---|---|---|---|---|---|---|---|---|
| Sl No. | peat | formaldehyde resin | carbamide | | carbamide to phenol-formaldehyde resin | peat to phenol-formaldehyde resin | | |
| 1 | 2 | 3 | 4 | 5 | 6 | 7 | 8 | 9 |
| 1 | 2.0 | 2.0 | 2.0 | 25.0 | 1:1 | 1:1 | 3.1 | 41.0 |
| 2 | 6.0 | 2.0 | 2.0 | 35.0 | 1:1 | 3:1 | 3.0 | 42.0 |
| 3 | 15.0 | 2.0 | 1.8 | 40.0 | 0.9:1 | 7:1 | 3.2 | 42.2 |
| 4 | 30.0 | 3.0 | 1.0 | 60.0 | 1:3 | 10:1 | 3.2 | 42.0 |
| 5 | 45.0 | 8.0 | 0.2 | 50.0 | 0.02:1 | 5.6:1 | 3.1 | 42.5 |
| 6 | 50.0 | 10.0 | — | 70.0 | — | 5:1 | 3.0 | 42.3 |
| 7 | — | 2.0 | — | — | — | — | 3.1 | 40.8 |

| Fiberboard water absorption, % (for | Fiberboard swelling, % (for 24 | Fiberboard density, | Fiberboard heat treatment | Concentration in waste waters, mg/l | Emission, mg/m$^3$ |
|---|---|---|---|---|---|

TABLE 3-continued

| Sl No. | 24 hours) 10 | hours) 11 | kg/m³ 12 | time, hours 13 | formaldehyde 14 | phenol 15 | formaldehyde 16 | phenol 17 |
|---|---|---|---|---|---|---|---|---|
| 1 | 20.4 | 15.0 | 892 | 2.0 | 10.0 | 12.0 | 0.001 | 0.004 |
| 2 | 20.6 | 15.0 | 872 | 2.0 | 6.8 | 8.0 | 0.001 | 0.004 |
| 3 | 22.8 | 18.2 | 862 | 2.0 | 4.3 | 6.5 | — | 0.002 |
| 4 | 23.6 | 18.4 | 860 | 2.5 | 0.7 | 3.0 | 0.001 | 0.003 |
| 5 | 24.2 | 19.1 | 865 | 1.2 | 0.7 | 2.0 | 0.01 | 0.001 |
| 6 | 25.0 | 19.3 | 867 | 1.5 | 0.5 | 2.0 | 0.01 | 0.001 |
| 7 | 21.4 | 14.9 | 870 | 4.0 | 25.0 | 17.0 | 0.01 | 0.01 |

We claim:

1. A method for fiberboard manufacture comprising the steps of steaming and grinding woodchips to obtain a wood pulp, using said wood pulp to prepare a slurry of wood pulp in water, mixing said slurry with a binder, a cure catalyst for the binder, a water-repellent additive, peat, and carbamide, casting the resultant mixture and dewatering said mixture to obtain a mat, and pressing said mat to obtain fiberboard which is subjected to heat treatment, the peat used having a moisture content of between 25 and 70 percent and the peat content in said mixture being between 2.5 and 50 percent by mass, with the ratio of absolutely dry peat to said binder equal to between 1.0–7:1.0, respectively, while the carbamide content in said mixture is between 0.2 and 2.0 percent by mass, with the ratio of said carbamide to said binder equal to between 0.02–1:1, respectively, said slurry being having a pH of about 5 and said binder being insoluble is water after cure.

* * * * *